(12) United States Patent
Dhuse

(10) Patent No.: US 10,305,988 B2
(45) Date of Patent: May 28, 2019

(54) ADAPTIVE RESOURCE UTILIZATION WITH REQUEST CANCELLATION

(71) Applicant: International Business Machines Corporation, Armonk, NY (US)

(72) Inventor: Greg R. Dhuse, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 74 days.

(21) Appl. No.: 15/341,571

(22) Filed: Nov. 2, 2016

(65) Prior Publication Data
US 2017/0054806 A1 Feb. 23, 2017

Related U.S. Application Data

(63) Continuation-in-part of application No. 13/683,951, filed on Nov. 21, 2012.
(Continued)

(51) Int. Cl.
*H04L 29/08* (2006.01)
*G06F 3/06* (2006.01)
(Continued)

(52) U.S. Cl.
CPC .......... *H04L 67/1097* (2013.01); *G06F 3/067* (2013.01); *G06F 3/0608* (2013.01);
(Continued)

(58) Field of Classification Search
USPC ........................................ 709/205–207, 217
See application file for complete search history.

(56) References Cited

U.S. PATENT DOCUMENTS 4,092,732 A 5/1978 Duchi
5,454,101 A 9/1995 MacKay et al.
(Continued)

OTHER PUBLICATIONS

Litwin, Witold, Rim Moussa, and Thomas Je Schwarz. "LH* RS: a highly available distributed data storage." In Proceedings of the Thirtieth international conference on Very large data bases—vol. 30, pp. 1289-1292. VLDB Endowment, 2004.*
(Continued)

*Primary Examiner* — Cheikh T Ndiaye
*Assistant Examiner* — Melaku Y Habtemariam
(74) *Attorney, Agent, or Firm* — Garlick & Markison; Timothy W. Markison; Shayne X. Short

(57) ABSTRACT

A computing device includes an interface configured to interface and communicate with a dispersed storage network (DSN), a memory that stores operational instructions, and a processing module operably coupled to the interface and memory such that the processing module, when operable within the computing device based on the operational instructions, is configured to perform various operations. The computing device receives a data object, dispersed error encodes the data object to generate a set of encoded data slices (EDSs), and determines whether there are a sufficient amount of write sequence operational resources of the DSN are available within the DSN to execute a write request for the set of EDSs to the DSN memory. The computing device transmits the set of EDSs to the DSN memory for storage or determines whether the write sequence operational resources may be modified for storage of the set of EDSs to the DSN memory.

20 Claims, 8 Drawing Sheets

Related U.S. Application Data

(60) Provisional application No. 61/564,185, filed on Nov. 28, 2011.

(51) Int. Cl.
*G06F 12/06* (2006.01)
*G06F 17/30* (2006.01)
*G06F 21/00* (2013.01)
*H04L 9/08* (2006.01)
*H04L 9/32* (2006.01)
*H04L 29/06* (2006.01)
*G06F 11/10* (2006.01)
*G06F 12/14* (2006.01)

(52) U.S. Cl.
CPC ........ *G06F 3/0641* (2013.01); *G06F 12/0607* (2013.01); *G06F 12/1408* (2013.01); *G06F 17/30194* (2013.01); *G06F 21/00* (2013.01); *H04L 9/0825* (2013.01); *H04L 9/3236* (2013.01); *H04L 65/10* (2013.01); *G06F 11/108* (2013.01); *G06F 2211/1028* (2013.01); *H04L 63/0428* (2013.01)

(56) References Cited

U.S. PATENT DOCUMENTS

| | | |
|---|---|---|
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1* | 7/2006 | Watson ............ G06F 17/30339 |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 8,442,070 B1* | 5/2013 | Go ..................... H04L 9/085 370/332 |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1* | 5/2003 | Shu ..................... G06F 11/1076 |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma |
| 2005/0100022 A1 | 5/2005 | Ramprashad |
| 2005/0114594 A1 | 5/2005 | Corbel et al. |
| 2005/0125593 A1 | 6/2005 | Karpoff et al. |
| 2005/0131993 A1 | 6/2005 | Fatula |
| 2005/0132070 A1 | 6/2005 | Redlich et al. |
| 2005/0144382 A1 | 6/2005 | Schmisseur |
| 2005/0229069 A1 | 10/2005 | Hassner et al. |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll |
| 2006/0269148 A1* | 11/2006 | Farber .................... G06Q 40/00 382/232 |
| 2007/0079081 A1* | 4/2007 | Gladwin ............. G06F 21/6227 711/154 |
| 2007/0079082 A1 | 4/2007 | Gladwin et al. |
| 2007/0079083 A1* | 4/2007 | Gladwin ............. G06F 21/6227 711/154 |
| 2007/0088970 A1 | 4/2007 | Buxton et al. |
| 2007/0088971 A1* | 4/2007 | Walker .................. H04L 1/0041 714/4.1 |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters et al. |
| 2008/0151724 A1* | 6/2008 | Anderson ............ G11B 33/127 369/53.42 |
| 2009/0094251 A1 | 4/2009 | Gladwin et al. |
| 2009/0094318 A1 | 4/2009 | Gladwin et al. |
| 2010/0023524 A1* | 1/2010 | Gladwin ............... G06F 3/0617 707/E17.032 |
| 2010/0266120 A1* | 10/2010 | Leggette ............. G06F 11/1012 380/28 |

OTHER PUBLICATIONS

Shamir; How to Share a Secret; Communications of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

(56) References Cited

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): String Representation of Distinguished Names; IETF Network Working Group; RFC 4514; Jun. 2006; pp. 1-15.
Sermersheim; Lightweight Directory Access Protocol (LDAP): The Protocol; IETF Network Working Group; RFC 1511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

\* cited by examiner

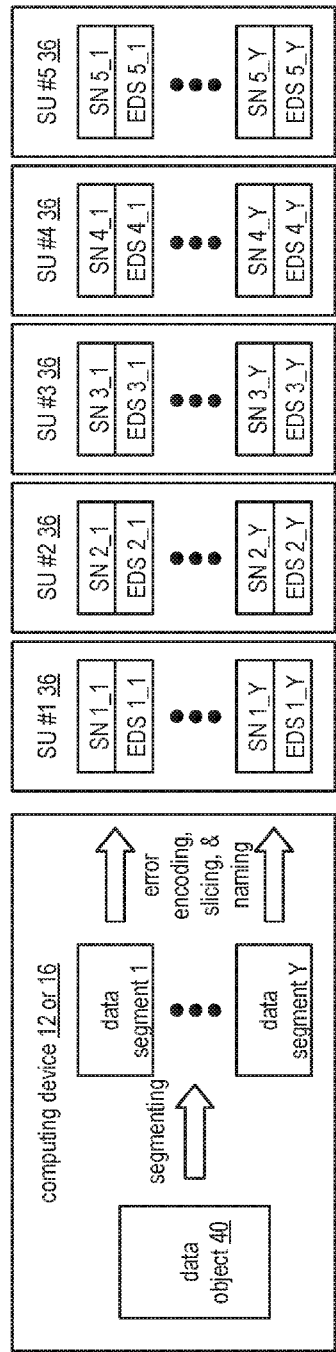
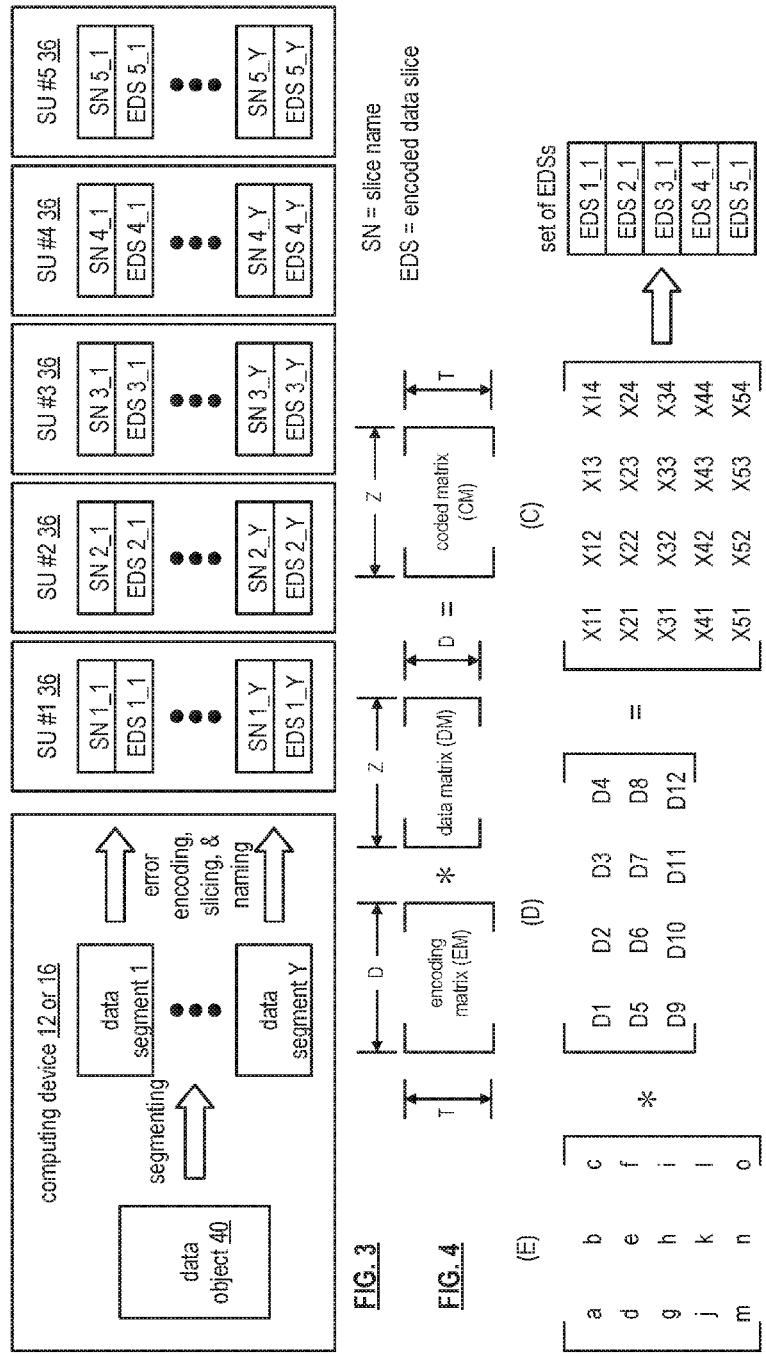

ADAPTIVE RESOURCE UTILIZATION WITH REQUEST CANCELLATION

CROSS REFERENCE TO RELATED PATENTS

The present U.S. Utility patent application also claims priority pursuant to 35 U.S.C. § 120, as a continuation-in-part (CIP) of U.S. Utility patent application Ser. No. 13/683,951, entitled "Prioritization of Messages of a Dispersed Storage Network," filed Nov. 21, 2012, pending, which claims priority pursuant to 35 U.S.C. § 119(e) to U.S. Provisional Application No. 61/564,185, entitled "Optimizing performance of dispersed storage network," filed Nov. 28, 2011, expired, all of which are hereby incorporated herein by reference in their entirety and made part of the present U.S. Utility patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Within storage systems, certain memory access requests may be unsuccessful for a various reasons. Excessive network traffic may make such memory access requests unsuccessful. Moreover, competition for access to the network may make some memory access requests successful and other memory access requests unsuccessful. The prior art does not provide an adequate means to ensure an acceptable level of success for memory access requests when these and other factors may deleteriously affect performance of the network.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
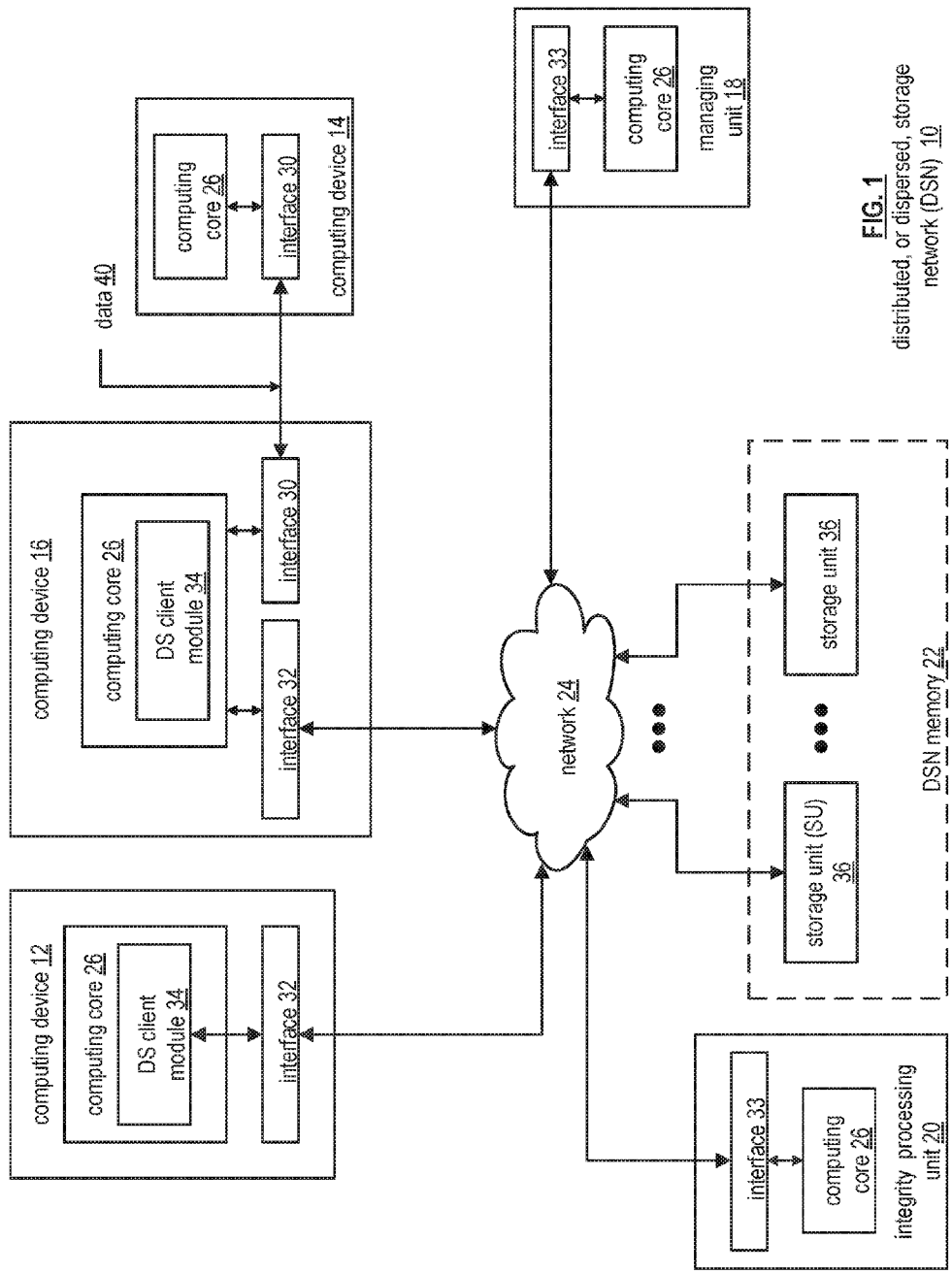
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
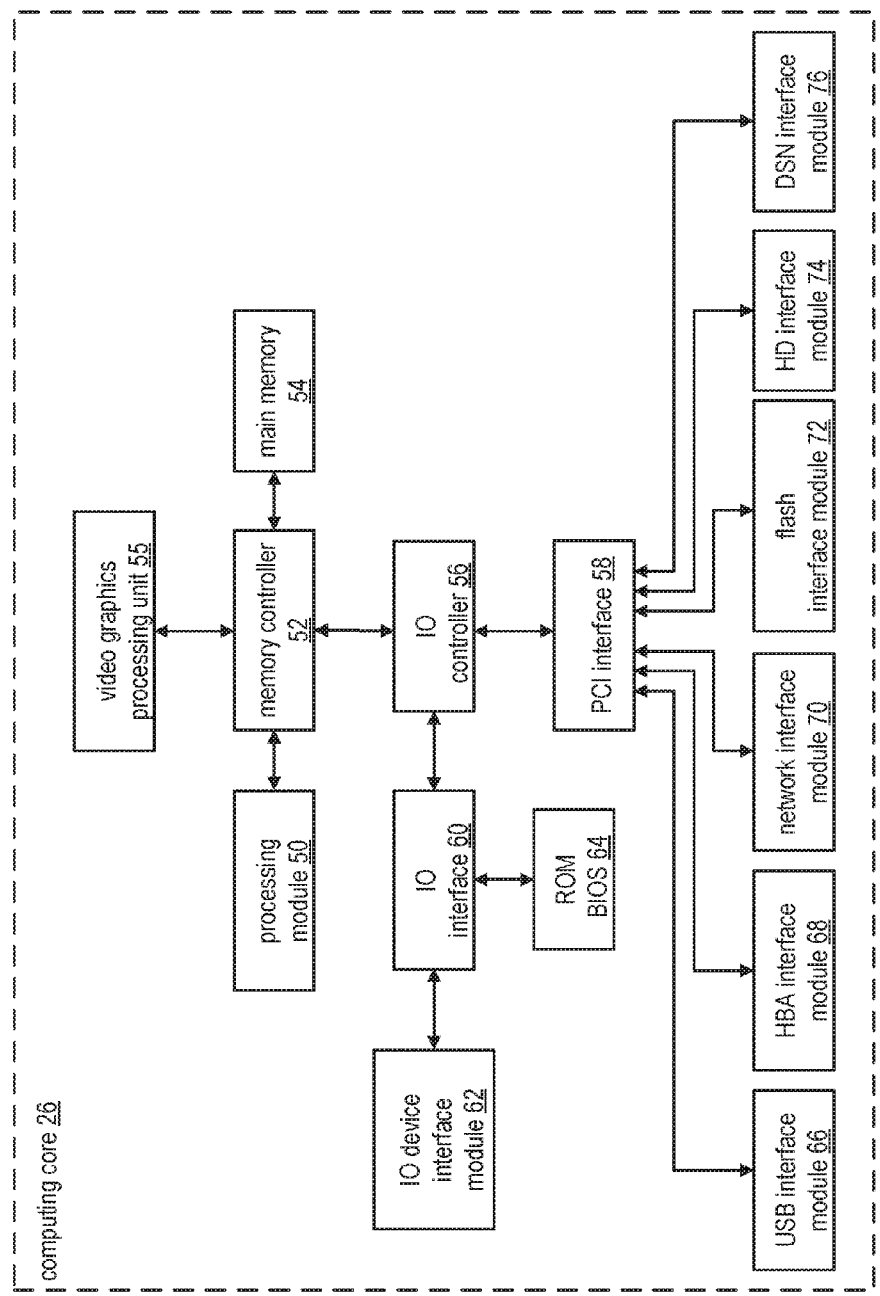
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN module 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing-device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN $5_{\_Y}$.

Figure 7:
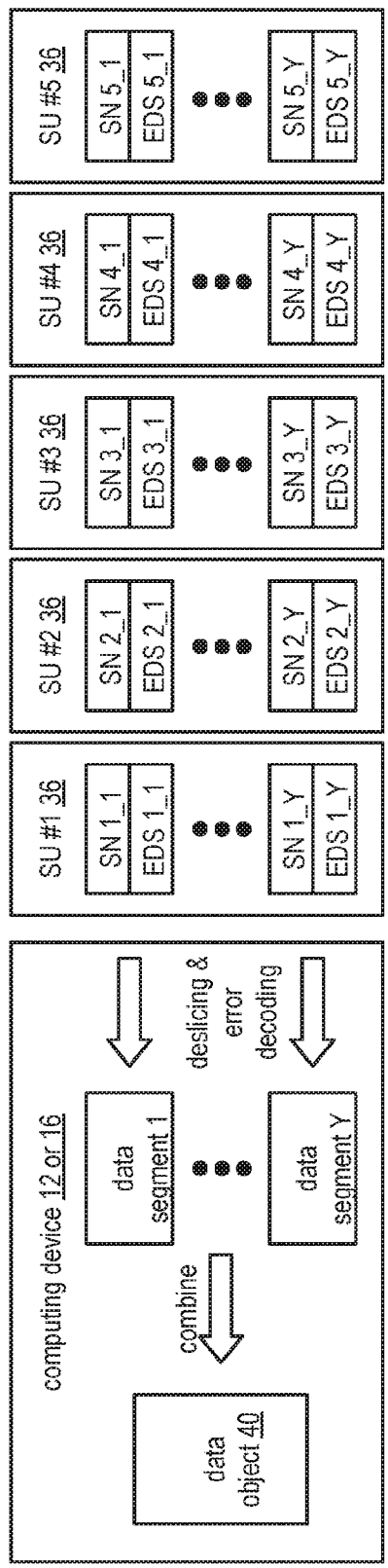
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
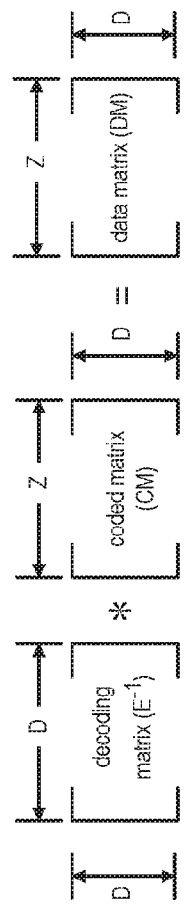
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
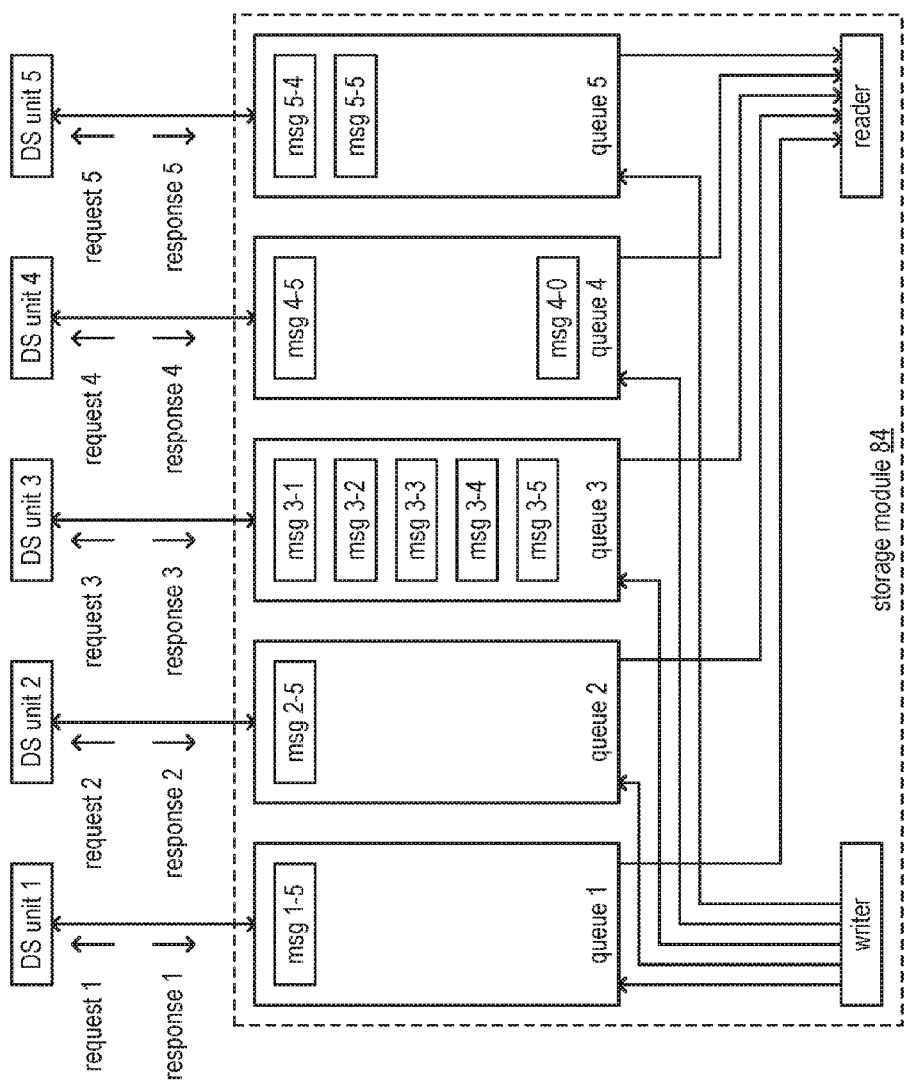
FIG. 9 is a schematic block diagram of an example of a storage module in accordance with the present invention.

FIG. 9 is a schematic block diagram of an example 900 of a storage module in accordance with the present invention. This is a schematic block diagram of an embodiment of a storage module 84 that includes a writer, a reader, and queues 1-5. The writer generates messages for transmission to one or more DS units of DS units 1-5. The reader interprets messages received from the one or more DS units of DS units 1-5. The messages include request messages and response messages. Messages transmitted from the storage module 84 to DS units 1-5 include requests 1-5. Messages that the storage module 84 receives from DS units 1-5 include responses 1-5.

Each queue may be implemented as one or more of a physical memory device, a plurality of memory devices, and a virtual allocation of storage capacity of one or more memory devices. As such, each queue may be associated with a fixed storage capacity. Each queue of queues 1-5 temporarily stores messages received from a DS unit waiting to be processed by the reader or messages from the writer to be transmitted to a DS unit. For example, the writer stores message 3-5 in queue 3 for transmission to DS unit 3. The queue sends message 3-5 to DS unit 3 via a network when message 3-5 is to be transmitted in accordance with a queue prioritization scheme.

The queue prioritization scheme may be based on one or more of a number of messages associated with the queue (e.g., pending messages), a prioritization approach (e.g., first in first out (FIFO), last in last out (LIFO)), a prioritization level associated with each of the messages associated with the queue, a network performance level, a DS unit performance level, and an order of message receipt by the queue. For instance, queue 3 sends message 3-5 to DS unit 3 when messages 3-1 through 3-4 have been successfully sent in accordance with a FIFO prioritization approach of the queue prioritization scheme. As another instance, queue 3 sends message 3-5 to DS unit 3 when message 3-1 has been successfully sent and prior to sending of messages 3-2 through 3-4 when a prioritization level associated with message 3-5 is greater than a privatization level associated with messages 3-2 through 3-4 and the prioritization level associated with message 3-5 is lower than a privatization level associated with message 3-1. As another example, queue 4 receives message 4-0 from DS unit 4 to be read by the reader. Queue 4 outputs message 4-0 to the reader in accordance with the queue prioritization scheme. The storage module 84 may delete a message stored in a queue when the message is outputted and is no longer required. The storage module 84 may change a message priority level of the message after message has been stored in a queue to affect a modified message transmission order. The storage module 84 may delete the message stored in the queue when the message is no longer required. The method to determine whether the message is no longer required, to delete the message, and to change the message priority is discussed in greater detail below.

Figure 10:
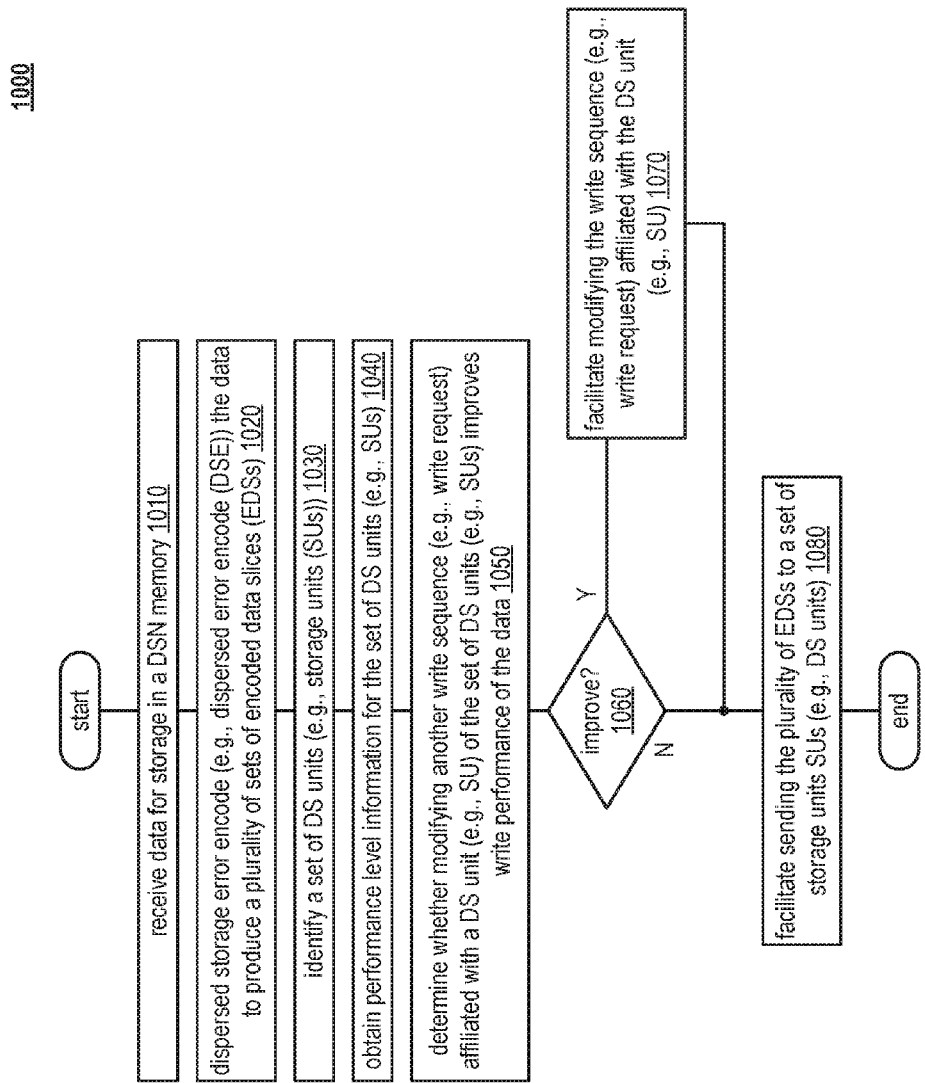
FIG. 10 is a schematic block diagram of an example of modifying a write requests (e.g., write sequence) in accordance with the present invention.

FIG. 10 is a schematic block diagram of an example 1000 of modifying a write requests (e.g., write sequence) in accordance with the present invention. The method 1000 begins with a step 1010 where a processing module (e.g., of a dispersed storage (DS) processing module) receives data for storage in a dispersed storage network (DSN) memory. The receiving the data may include receiving one or more of the data, a data object, a data file, a data stream (e.g., video, audio), a filename, an object identifier (ID), a data ID, a block ID, a source name, a vault source name, a segment allocation table vault source name, a user ID, a DSN resource ID, a vault ID, a DS unit ID, a DS unit storage set ID, a data size indicator, and a storage request. The method 1000 continues at the step 1020 where the processing module dispersed storage error encodes the data to produce a plurality of sets of encoded data slices in accordance with dispersal parameters. The dispersal parameters may include one or more of a pillar width, a write threshold, a read threshold, a decode threshold, an error coding matrix, an information dispersal algorithm (IDA) ID, an encryption algorithm ID, and an encryption key.

The method 1000 continues at the step 1030 where the processing module identifies a set of DS units. The identification may be based on one or more of a vault look up based on a user ID, a source name generated based on the data, an available to DS unit list, and a source name to DS unit ID table lookup. The method 1000 continues at the step where the processing module obtains performance level information for the set of DS units. The performance level information includes one or more of average latency for message transmission, average latency for receiving a message, queue resource utilization, number of messages in a queue (e.g., queue depth), write bandwidth utilization, and read bandwidth utilization. The obtaining may be based on one or more of a performance level historical record lookup, initiating a test, a query, and receiving the performance level information.

The method 1000 continues at the step 1040 where the processing module determines whether modifying another write sequence affiliated with a DS unit of the set of DS units improves write performance of the data. The determination may be based on one or more of the performance level information for the set of DS units and write sequence information of other active write sequences (e.g., a number of favorable write responses corresponding to each other active write sequence, a write threshold associated with each other active write sequence). For example, the processing module determines that modifying another write sequence affiliated with a DS unit of the DS units improves write performance of the data when the other write sequence has received a write threshold number of favorable write responses and there are one or more pending write requests associated with the other write sequence in one or more queues.

The method 1000 branches to the step 1070 where the processing module facilitates sending the plurality of encoded data slices to the set of DS units when the processing module determines that modifying another write sequence affiliated with the DS unit of the set of DS units does not improve write performance of the data. The method 1000 continues to the next step when the processing module determines that modifying another write sequence affiliated with the DS unit of the set of DS units improves write performance of the data. The method 1000 continues at the next step where the processing module facilitates modifying the write sequence affiliated with the DS unit. The facilitation may be based on one or more of the performance level information, the write sequence information associated with the DS unit, and a modification approach. The modification approach includes selecting a write sequence to delete and/or reprioritize including at least one of selecting a write sequence associated with an oldest write sequence, selecting a write sequence associated with a lowest priority level, selecting a write sequence that has a most number of favorable write responses, selecting a write sequence that has at least a write threshold number of favorable write responses, and selecting a write sequence that has a most number of favorable write responses above an associated write threshold. The method 1000 continues to the step where the processing module facilitates sending the plurality of encoded data slices to the set of DS units.

The method 1000 continues at the step 1080 where the processing module facilitates sending the plurality of encoded data slices to the set of DS units. The facilitation includes one or more of generating a plurality of encoded data slice write requests that includes the plurality of sets of encoded data slices, establishing a priority level (e.g., in accordance with the modification of the write sequence affiliated with the DS unit) for at least one encoded data slice write request of the plurality of encoded data slice write requests, and storing the plurality encoded data slice write requests in corresponding queues for transmission to the set of DS units.

Figure 11:
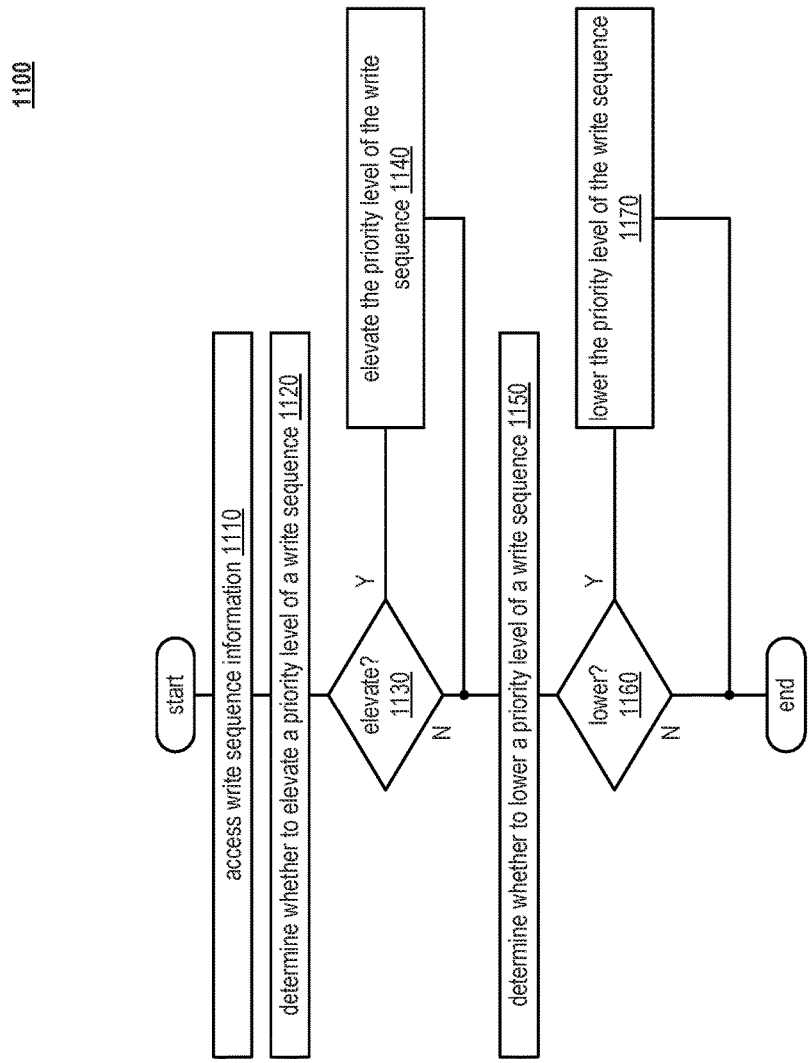
FIG. 11 is a schematic block diagram of another example of modifying a write requests (e.g., write sequence) in accordance with the present invention.

FIG. 11 is a schematic block diagram of another example 1100 of modifying a write requests (e.g., write sequence) in accordance with the present invention. The method 1100 begins with a step where a processing module (e.g., of a dispersed storage (DS) processing module) accesses write sequence information. The write sequence information includes one or more of a queue depth, a priority level of a pending request, age of a pending request, number of favorable write responses received so far, and a write threshold number. The accessing may be based on one or more of retrieving a message queue, lookup, receiving a request, a query, and an error message.

The method 1100 continues at the step 1120 for the processing module determines whether to elevate a priority level of a write sequence. The priority level of the write sequence may be utilized in determining a transmission order of two or more pending write request messages of a common queue such that a write request associated with a higher priority level is transmitted prior to a write request associated with a lower priority level. The determination is based on of the access write sequence information. For example, the processing module determines to elevate the priority level of the write sequence when the write sequence is associated with an oldest write sequence of a plurality of write sequences that has not received a write threshold number of favorable write responses. Each write sequence of the plurality of write sequences may be associated with a different write threshold number. As another example, the processing module determines to elevate the priority level of the write sequence when the write sequence is associated with a highest priority write sequence of the plurality of write sequences that has not received the write threshold number of favorable write responses.

The method 1100 branches to the step 1130 where the processing module determines whether to lower a priority level of a write sequence when the processing module determines not to elevate the priority level of the write sequence. The method 1100 continues to the next step 1150 when the processing module determines to elevate the priority level of the write sequence. The method 1100 continues at the next step 1140 where the processing module elevates the priority level of the write sequence. The elevation of the priority level includes at least one of modifying a priority level indicator of an associated write request in a message queue to include a higher priority level number and reordering pending write requests in the queue such that highest priority requests will be transmitted next. The method 1100 continues to the step 1150 where the processing module determines whether to lower the priority level of the write sequence.

The method 1100 continues at the step where the processing module determines whether to lower the priority level of the write sequence. The determination is based on of the access write sequence information. For example, the processing module determines to lower the priority level of the write sequence when the write sequence is associated with a write sequence of a plurality of write sequences that has received a write threshold number of favorable write responses. As another example, the processing module determines to lower the priority level of the write sequence when the write sequence is associated with a highest priority write sequence of the plurality of write sequences that has received the write threshold number of favorable write responses.

The method 1100 branches to the step where the method 1100 ends when the processing module determines not to lower the priority level of the write sequence. The method 1100 continues to the next step 1160 when the processing module determines to lower the priority level of the write sequence. The method 1100 continues at the next step 1170 where the processing module lowers the priority level of the write sequence. The lowering of the priority level includes at least one of modifying a priority level indicator of an associated write request in a message queue to include a lower priority level number and reordering pending write requests in the queue such that highest priority requests will be transmitted next. The method 1100 continues to the step where the method 1100 ends.

Figure 12:
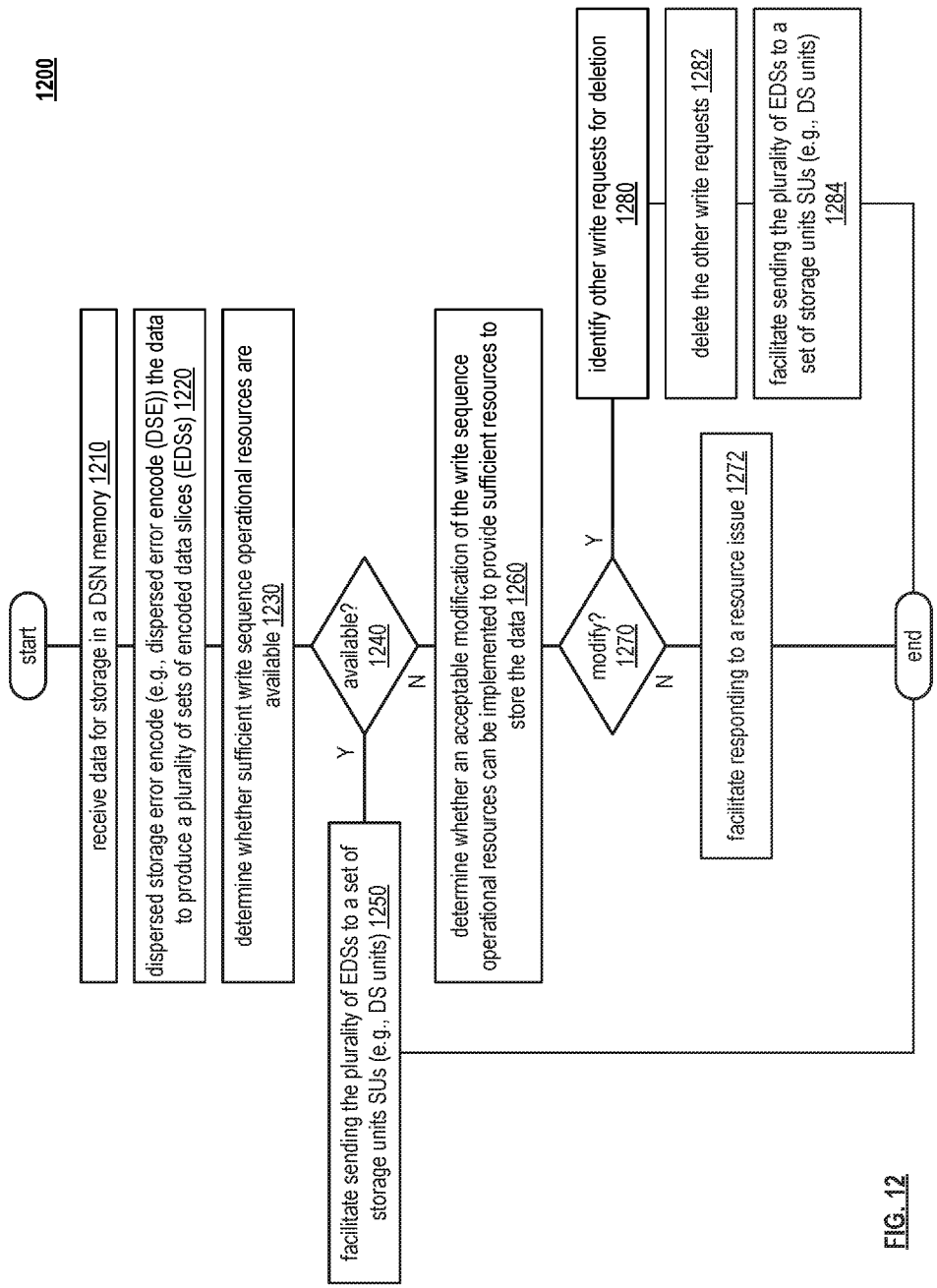
FIG. 12 is a schematic block diagram of another example of modifying a write requests (e.g., write sequence) in accordance with the present invention.

FIG. 12 is a schematic block diagram of another example 1200 of modifying a write requests (e.g., write sequence) in accordance with the present invention. This flowchart illustrates another example of modifying a write sequence, which include similar steps to FIG. 10 (e.g., steps 1210 and 12220 in FIG. 12). The method 1200 begins with the steps of FIG. 10 where a processing module (e.g., of a dispersed storage (DS) processing module) receives data for storage in a dispersed storage network (DSN) memory and dispersed storage error encodes the data to produce a plurality of sets of encoded data slices in accordance with dispersal parameters.

The method 1200 continues at the step 1230 where the processing module determines whether sufficient write sequence operational resources are available. The write sequence operational resources include one or more of a memory device utilized to store a queue, a memory space allocation utilized to store the queue, and an amount of available memory for storage of write requests. The determination may include on one or more of obtaining a data size indicator associated with the data, obtaining a current utilization level with regards to the write sequence operational resources, comparing the data size indicator with the current utilization level, and indicating that sufficient write sequence operational resources are available when the comparison is favorable. For example, the processing module determines that sufficient write sequence operational resources are available when an available resource indicator of the current utilization level is greater than the data size indicator.

The method 1200 branches to the step 1240 where the processing module determines whether an acceptable modification of the write sequence operational resources can be implemented to provide sufficient resources to store the data when the processing module determines that sufficient write sequence operational resources are not available. The method 1200 continues to the step 1250 where the processing module facilitates sending the plurality of encoded data slices to a set of DS units when the processing module determines that sufficient write sequence operational resources are available. The method 1200 continues at the step 1250 where the processing module facilitates sending the plurality of encoded data slices to the set of DS units.

The method 1200 continues at the step 1260 where the processing module determines whether an acceptable modification of the write sequence operational resources can be implemented to provide sufficient resources to store the data when the processing module determines that sufficient write sequence operational resources are not available. The determination may be based on one or more of operational resource availability and write sequence information of other active write sequences (e.g., a number of favorable write responses corresponding to other active write sequences, a write threshold associated with the other active write sequences). For example, the processing module determines that an acceptable modification of the write sequence operational resources can be implemented to provide sufficient resources to store the data when the write sequence information of another active write sequence indicates that a write threshold number of favorable write responses have been received and pending write requests utilizing the write sequence operational resources may be deleted freeing up resources greater than a number of resources required to store the data (e.g., the pending write requests include one or more encoded data slices that are greater in size than one or more data slices of the data).

The method 1200 branches to the step where processing module identifies other write requests for deletion when the processing module determines that an acceptable modification of the write sequence operational resources can be implemented to provide sufficient resources to store the data. The method 1200 continues to the next step when the processing module determines that an acceptable modification of the write sequence operational resources cannot be implemented to provide sufficient resources to store the data. The method 1200 continues at the next step 1272 where the processing module facilitates responding to a resource issue. The facilitation includes one or more of sending a store data response that includes an indication of the resource issue, sending an error message, deactivating a process that receives new data storage requests, and activating additional operational resources.

The method 1200 continues at the step 1280 where the processing module identifies other write requests for deletion when the processing module determines that an acceptable modification of the write sequence operational resources can be implemented to provide sufficient resources to store the data. The identification includes identifying at least one pending write request associated with at least one other write sequence, wherein the pending write request is associated with write sequence operational resources greater than a number of write sequence operational resources required to store the data, and wherein the other write sequence has received at least a write threshold number of favorable write responses. For example, the processing module identifies the pending write request that includes the largest encoded data slice of a plurality of encoded data slices associated with a plurality of pending write requests, wherein each pending write request of the plurality of pending write requests is associated with a write sequence that has received at least a write threshold number of favorable write responses.

The method 1200 continues at the step 1282 where the processing module deletes the other write requests. For example, the processing module deletes the other write requests from one or more associated queues of the write sequence operational resources. The method 1200 continues with the step 1284 where the processing module facilitates sending the plurality of encoded data slices to a set of DS units.

In an example of operation and implementation, a computing device includes an interface configured to interface and communicate with a dispersed storage network (DSN), a memory that stores operational instructions, and a processing module operably coupled to the interface and memory such that the processing module, when operable within the computing device based on the operational instructions, is configured to perform various operations.

In an example, the computing device receives a data object for storage in DSN memory and dispersed error encode the data object to generate a set of encoded data slices (EDSs). Note that the data object is segmented into a plurality of data segments, and a data segment of the plurality of data segments is dispersed error encoded in accordance with dispersed error encoding parameters to produce the set of EDSs that is of pillar width. The computing device then determines whether there is a sufficient amount of write sequence operational resources of the DSN are available within the DSN to execute a write request for the set of EDSs to the DSN memory.

When the sufficient amount of the write sequence operational resources of the DSN are determined to be available within the DSN to execute the write request for the set of EDSs to the DSN memory, the computing device transmits the set of EDSs to the DSN memory for storage therein. When the sufficient amount of the write sequence operational resources of the DSN determined not to be available within the DSN to execute the write request for the set of EDSs to the DSN memory, the computing device determines whether modification of the write sequence operational resources provides for the sufficient amount of the write sequence operational resources of the DSN to execute the write request for the set of EDSs to the DSN memory. When modification of the write sequence operational resources provides for the sufficient amount of the write sequence operational resources of the DSN to execute the write request for the set of EDSs to the DSN memory, computing device performs the modification of the write sequence operational resources to generate modified write sequence operational resources and transmit the set of EDSs to the DSN memory for storage therein based on the modified write sequence operational resources. When modification of the write sequence operational resources does not provide for the sufficient amount of the write sequence operational resources of the DSN to execute the write request for the set of EDSs to the DSN memory, the computing device transmits a response that indicates a write sequence operational resources failure issue to another computing device.

In other examples, the computing device determines there are the sufficient amount of the write sequence operational resources of the DSN available within the DSN to execute the write request for the set of EDSs to the DSN memory based on a data size indicator associated with the write request for the set of EDSs to the DSN memory comparing favorably to the write sequence operational resources of the DSN.

In even other examples, the computing device determines there are the sufficient amount of the write sequence operational resources of the DSN available within the DSN to execute the write request for the set of EDSs to the DSN memory based on available DSN resources comparing favorably to the write sequence operational resources of the DSN.

In some examples, the computing device performs the modification of the write sequence operational resources to generate the modified write sequence operational resources including to delete at least one other write request for the set of EDSs to the DSN memory or at least one other write request for another set of EDSs to the DSN memory.

In other examples, the computing device determines whether the modification of the write sequence operational resources provides for the sufficient amount of the write sequence operational resources of the DSN to execute the write request for the set of EDSs to the DSN memory including to determine whether at least a write threshold number of favorable write responses have been received for at least one other write request for another set of EDSs to the DSN memory. The computing device then determines that modification of the write sequence operational resources provides for the sufficient amount of the write sequence operational resources of the DSN to execute the write request for the set of EDSs to the DSN memory when the at least write threshold number of favorable write responses have been received for the at least one other write request for the another set of EDSs to the DSN memory, wherein a write threshold number of EDSs provides for a successful transfer of the set of EDSs from a first at least one location in the DSN to a second at least one location in the DSN.

Note that the computing device may be located at a first premises that is remotely located from at least one storage unit (SU) of a plurality of SUs within the DSN memory that distributedly store the set of EDSs. Also, note that the computing device may be of any of a variety of types of devices as described herein and/or their equivalents including a storage unit (SU) of a plurality of SUs within the DSN memory that distributedly store the set of EDSs, a wireless smart phone, a laptop, a tablet, a personal computers (PC), a work station, and/or a video game device. Note also that the DSN may be implemented to include or be based on any of a number of different types of communication systems including a wireless communication system, a wire lined communication systems, a non-public intranet system, a public internet system, a local area network (LAN), and/or a wide area network (WAN).

In some examples, reliability and availability of operation within a DSN may be improved by writing as many EDSs as possible. However, client-side resources may be limited in some examples, and performance requirements may necessitate dropping some write requests over the write threshold. When DSN resources are contended, pushing the decision to drop out as long as possible can yield real reliability benefits. This disclosure presents various embodiments, examples, etc. by which pending writes can be cancelled any time after the commit threshold has been reached on their transaction. Cancellation does not occur until the client resource pool is full and a new request requires those resources. Only the minimum number of requests necessary to satisfy the new request are actually cancelled. Request cancellation may be implemented to involve one or more of removing a request which is queued to send over the network before it is sent or sending a cancellation notice to a DS unit (e.g., storage unit (SU)) which has already received the request.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/ or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device comprising:
an interface configured to interface and communicate with a dispersed storage network (DSN);
memory that stores operational instructions; and
a processing module operably coupled to the interface and to the memory, wherein the processing module, when operable within the computing device based on the operational instructions, is configured to:
receive a data object for storage in DSN memory;
dispersed error encode the data object to generate a set of encoded data slices (EDSs), wherein the data object is segmented into a plurality of data segments, wherein a data segment of the plurality of data segments is dispersed error encoded in accordance with dispersed error encoding parameters to produce the set of EDSs that includes a pillar width number of EDSs, wherein a decode threshold number of EDSs of the set of EDSs are needed to recover the data segment, wherein the dispersed error encoding parameters include an encoding matrix with a size that is based on the pillar width number and the decode threshold number;
determine whether there are a sufficient amount of write sequence operational resources of the DSN are available within the DSN to execute a write request for the set of EDSs to the DSN memory, wherein the write sequence operational resources of the DSN include one or more queues in communication with the DSN memory that facilitate transmission of requests to the DSN memory and reception of responses from the DSN memory in accordance with a queue prioritization scheme;
when the sufficient amount of the write sequence operational resources of the DSN are determined to be available within the DSN to execute the write request for the set of EDSs to the DSN memory, transmit the set of EDSs to the DSN memory for storage therein;

when the sufficient amount of the write sequence operational resources of the DSN determined not to be available within the DSN to execute the write request for the set of EDSs to the DSN memory:

determine whether modification of the write sequence operational resources provides for the sufficient amount of the write sequence operational resources of the DSN to execute the write request for the set of EDSs to the DSN memory;

when modification of the write sequence operational resources provides for the sufficient amount of the write sequence operational resources of the DSN to execute the write request for the set of EDSs to the DSN memory, perform the modification of the write sequence operational resources to generate modified write sequence operational resources and transmit the set of EDSs to the DSN memory for storage therein based on the modified write sequence operational resources; and when modification of the write sequence operational resources does not provide for the sufficient amount of the write sequence operational resources of the DSN to execute the write request for the set of EDSs to the DSN memory, transmit a response that indicates a write sequence operational resources failure issue to another computing device.

2. The computing device of claim 1, wherein the processing module, when operable within the computing device based on the operational instructions, is further configured to:

determine there are the sufficient amount of the write sequence operational resources of the DSN available within the DSN to execute the write request for the set of EDSs to the DSN memory based on a data size indicator associated with the write request for the set of EDSs to the DSN memory comparing favorably to the write sequence operational resources of the DSN.

3. The computing device of claim 1, wherein the processing module, when operable within the computing device based on the operational instructions, is further configured to:

determine there are the sufficient amount of the write sequence operational resources of the DSN available within the DSN to execute the write request for the set of EDSs to the DSN memory based on available DSN resources comparing favorably to the write sequence operational resources of the DSN.

4. The computing device of claim 1, wherein the processing module, when operable within the computing device based on the operational instructions, is further configured to:

perform the modification of the write sequence operational resources to generate the modified write sequence operational resources including to delete at least one other write request for the set of EDSs to the DSN memory or at least one other write request for another set of EDSs to the DSN memory.

5. The computing device of claim 1, wherein the processing module, when operable within the computing device based on the operational instructions, is further configured to:

determine whether the modification of the write sequence operational resources provides for the sufficient amount of the write sequence operational resources of the DSN to execute the write request for the set of EDSs to the DSN memory including to determine whether at least a write threshold number of favorable write responses have been received for at least one other write request for another set of EDSs to the DSN memory; and determine that modification of the write sequence operational resources provides for the sufficient amount of the write sequence operational resources of the DSN to execute the write request for the set of EDSs to the DSN memory when the at least write threshold number of favorable write responses have been received for the at least one other write request for the another set of EDSs to the DSN memory, wherein a write threshold number of EDSs provides for a successful transfer of the set of EDSs from a first at least one location in the DSN to a second at least one location in the DSN.

6. The computing device of claim 1, wherein the computing device is located at a first premises that is remotely located from at least one storage unit (SU) of a plurality of SUs within the DSN memory that distributedly store the set of EDSs.

7. The computing device of claim 1 further comprising:

a storage unit (SU) of a plurality of SUs within the DSN memory that distributedly store the set of EDSs, a wireless smart phone, a laptop, a tablet, a personal computers (PC), a work station, or a video game device.

8. The computing device of claim 1, wherein the DSN includes at least one of a wireless communication system, a wire lined communication system, a non-public intranet system, a public internet system, a local area network (LAN), or a wide area network (WAN).

9. A computing device comprising:

an interface configured to interface and communicate with a dispersed storage network (DSN);

memory that stores operational instructions; and a processing module operably coupled to the interface and to the memory, wherein the processing module, when operable within the computing device based on the operational instructions, is configured to:

receive a data object for storage in DSN memory;

dispersed error encode the data object to generate a set of encoded data slices (EDSs), wherein the data object is segmented into a plurality of data segments, wherein a data segment of the plurality of data segments is dispersed error encoded in accordance with dispersed error encoding parameters to produce the set of EDSs that includes a pillar width number of EDSs, wherein a decode threshold number of EDSs of the set of EDSs are needed to recover the data segment, wherein the dispersed error encoding parameters include an encoding matrix with a size that is based on the pillar width number and the decode threshold number;

determine whether there are a sufficient amount of write sequence operational resources of the DSN are available within the DSN to execute a write request for the set of EDSs to the DSN memory based on comparison of at least one of a data size indicator associated with the write request for the set of EDSs to the DSN memory or available DSN resources to the write sequence operational resources of the DSN, wherein the write sequence operational resources of the DSN include one or more queues in communication with the DSN memory that facilitate transmission of requests to the DSN memory and reception of responses from the DSN memory in accordance with a queue prioritization scheme;

when the sufficient amount of the write sequence operational resources of the DSN are determined to be available within the DSN to execute the write request for the set of EDSs to the DSN memory, transmit the set of EDSs to the DSN memory for storage therein;

when the sufficient amount of the write sequence operational resources of the DSN determined not to be available within the DSN to execute the write request for the set of EDSs to the DSN memory:

determine whether modification of the write sequence operational resources provides for the sufficient amount of the write sequence operational resources of the DSN to execute the write request for the set of EDSs to the DSN memory;

when modification of the write sequence operational resources provides for the sufficient amount of the write sequence operational resources of the DSN to execute the write request for the set of EDSs to the DSN memory, perform the modification of the write sequence operational resources to generate modified write sequence operational resources including to delete at least one other write request for the set of EDSs to the DSN memory or at least one other write request for another set of EDSs to the DSN memory and transmit the set of EDSs to the DSN memory for storage therein based on the modified write sequence operational resources; and when modification of the write sequence operational resources does not provide for the sufficient amount of the write sequence operational resources of the DSN to execute the write request for the set of EDSs to the DSN memory, transmit a response that indicates a write sequence operational resources failure issue to another computing device.

10. The computing device of claim 9, wherein the processing module, when operable within the computing device based on the operational instructions, is further configured to:

determine whether the modification of the write sequence operational resources provides for the sufficient amount of the write sequence operational resources of the DSN to execute the write request for the set of EDSs to the DSN memory including to determine whether at least a write threshold number of favorable write responses have been received for at least one other write request for another set of EDSs to the DSN memory; and determine that modification of the write sequence operational resources provides for the sufficient amount of the write sequence operational resources of the DSN to execute the write request for the set of EDSs to the DSN memory when the at least write threshold number of favorable write responses have been received for the at least one other write request for the another set of EDSs to the DSN memory, wherein a write threshold number of EDSs provides for a successful transfer of the set of EDSs from a first at least one location in the DSN to a second at least one location in the DSN.

11. The computing device of claim 9, wherein the computing device is located at a first premises that is remotely located from at least one storage unit (SU) of a plurality of SUs within the DSN memory that distributedly store the set of EDSs.

12. The computing device of claim 9 further comprising:

a storage unit (SU) of a plurality of SUs within the DSN memory that distributedly store the set of EDSs, a wireless smart phone, a laptop, a tablet, a personal computers (PC), a work station, or a video game device.

13. The computing device of claim 9, wherein the DSN includes at least one of a wireless communication system, a wire lined communication system, a non-public intranet system, a public internet system, a local area network (LAN), or a wide area network (WAN).

14. A method for execution by a computing device, the method comprising:

receiving, via an interface of the computing device to interface and communicate with a dispersed storage network (DSN), a data object for storage in DSN memory;

dispersed error encoding the data object to generate a set of encoded data slices (EDSs), wherein the data object is segmented into a plurality of data segments, wherein a data segment of the plurality of data segments is dispersed error encoded in accordance with dispersed error encoding parameters to produce the set of EDSs that includes a pillar width number of EDSs, wherein a decode threshold number of EDSs of the set of EDSs are needed to recover the data segment, wherein the dispersed error encoding parameters include an encoding matrix with a size that is based on the pillar width number and the decode threshold number;

determining whether there are a sufficient amount of write sequence operational resources of the DSN are available within the DSN to execute a write request for the set of EDSs to the DSN memory, wherein the write sequence operational resources of the DSN include one or more queues in communication with the DSN memory that facilitate transmission of requests to the DSN memory and reception of responses from the DSN memory in accordance with a queue prioritization scheme;

when the sufficient amount of the write sequence operational resources of the DSN are determined to be available within the DSN to execute the write request for the set of EDSs to the DSN memory, transmitting the set of EDSs to the DSN memory for storage therein;

when the sufficient amount of the write sequence operational resources of the DSN determined not to be available within the DSN to execute the write request for the set of EDSs to the DSN memory:

determining whether modification of the write sequence operational resources provides for the sufficient amount of the write sequence operational resources of the DSN to execute the write request for the set of EDSs to the DSN memory;

when modification of the write sequence operational resources provides for the sufficient amount of the write sequence operational resources of the DSN to execute the write request for the set of EDSs to the DSN memory, performing the modification of the write sequence operational resources to generate modified write sequence operational resources and transmit the set of EDSs to the DSN memory for storage therein based on the modified write sequence operational resources; and when modification of the write sequence operational resources does not provide for the sufficient amount of the write sequence operational resources of the DSN to execute the write request for the set of EDSs to the DSN memory, transmitting a response that indicates a write sequence operational resources failure issue to another computing device.

15. The method of claim 14 further comprising:
determining there are the sufficient amount of the write sequence operational resources of the DSN available within the DSN to execute the write request for the set of EDSs to the DSN memory based on a data size indicator associated with the write request for the set of EDSs to the DSN memory comparing favorably to the write sequence operational resources of the DSN.

16. The method of claim 14 further comprising:
determining there are the sufficient amount of the write sequence operational resources of the DSN available within the DSN to execute the write request for the set of EDSs to the DSN memory based on available DSN resources comparing favorably to the write sequence operational resources of the DSN.

17. The method of claim 14 further comprising:
performing the modification of the write sequence operational resources to generate the modified write sequence operational resources including to delete at least one other write request for the set of EDSs to the DSN memory or at least one other write request for another set of EDSs to the DSN memory.

18. The method of claim 14 further comprising:
determining whether the modification of the write sequence operational resources provides for the sufficient amount of the write sequence operational resources of the DSN to execute the write request for the set of EDSs to the DSN memory including to determine whether at least a write threshold number of favorable write responses have been received for at least one other write request for another set of EDSs to the DSN memory; and
determining that modification of the write sequence operational resources provides for the sufficient amount of the write sequence operational resources of the DSN to execute the write request for the set of EDSs to the DSN memory when the at least write threshold number of favorable write responses have been received for the at least one other write request for the another set of EDSs to the DSN memory, wherein a write threshold number of EDSs provides for a successful transfer of the set of EDSs from a first at least one location in the DSN to a second at least one location in the DSN.

19. The method of claim 14, wherein the computing device includes a storage unit (SU) of a plurality of SUs within the DSN memory that distributedly store the set of EDSs, a wireless smart phone, a laptop, a tablet, a personal computers (PC), a work station, or a video game device.

20. The method of claim 14, wherein the DSN includes at least one of a wireless communication system, a wire lined communication system, a non-public intranet system, a public internet system, a local area network (LAN), or a wide area network (WAN).

* * * * *